Figure 1:
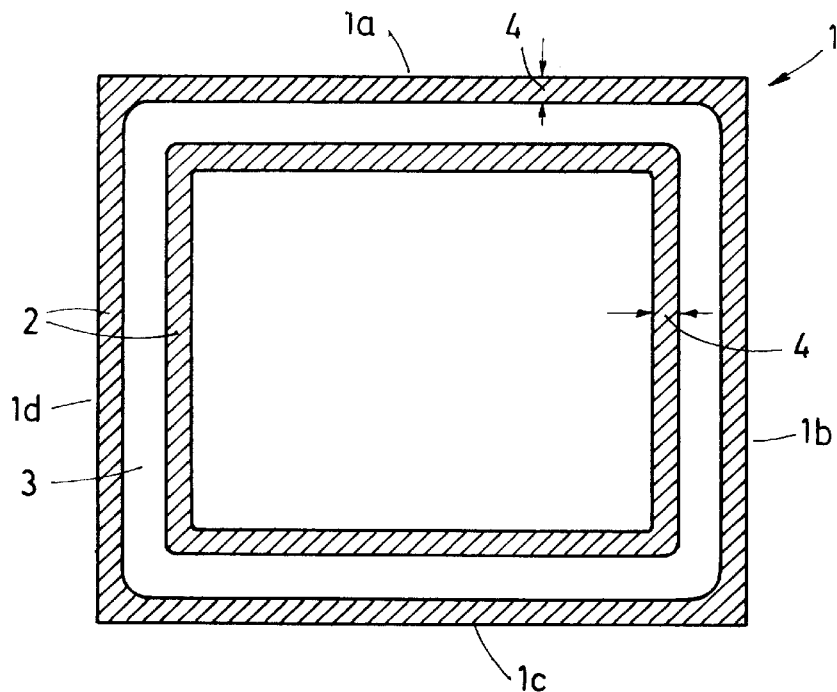

United States Patent [19] [11] Patent Number: 6,019,935
Eckardt et al. [45] Date of Patent: Feb. 1, 2000

| [54] | METHOD FOR INJECTION MOLDING OF MOLDED PARTS OF THERMOPLASTIC MATERIAL |
|---|---|
| [75] | Inventors: Helmut Eckardt, Meinerzhagen; Jürgen Ehritt, Hilchenbach; Klaus Lüsebrink; Michael Renger, both of Meinerzhagen, all of Germany |
| [73] | Assignee: Hattenfled GmbH, Meinerzhagen, Germany |
| [21] | Appl. No.: 08/416,692 |
| [22] | PCT Filed: Oct. 1, 1993 |
| [86] | PCT No.: PCT/EP93/02694 |
| | § 371 Date: Apr. 19, 1996 |
| | § 102(e) Date: Apr. 19, 1996 |
| [87] | PCT Pub. No.: WO94/08773 |
| | PCT Pub. Date: Apr. 28, 1994 |

[30] Foreign Application Priority Data

Oct. 8, 1992 [DE] Germany ............................. 42 33 927
Oct. 22, 1992 [DE] Germany ............................. 42 35 664

[51] Int. Cl.⁷ ............................................... B29C 45/00
[52] U.S. Cl. ............................................... 264/572
[58] Field of Search .................................... 264/572

[56] References Cited

U.S. PATENT DOCUMENTS 4,106,887 8/1978 Yasuike et al. ..................... 264/572
5,118,455 6/1992 Loren ................................. 264/572
5,135,703 8/1992 Hunerberg et al. ................ 264/572
5,204,050 4/1993 Loren .
5,612,067 3/1997 Kurihara et al. ................... 264/572
5,759,479 6/1998 Gotterbauer ....................... 264/572

FOREIGN PATENT DOCUMENTS 3-274119 12/1991 Japan ................................. 264/572
4168017 6/1992 Japan .
9000466 1/1990 WIPO .
9104146 4/1991 WIPO .

OTHER PUBLICATIONS

Abstract for Japanese Publication 4–168,017, Patent Abstracts of Japan, Jun. 1992.

*Primary Examiner*—Catherine Timm
*Attorney, Agent, or Firm*—Brown & Wood, LLP

[57] ABSTRACT

Proposed is a process for injection molding of products (1) made of thermoplastic material, whose walls (2) enclose a hollow space (3), wherein the molten plastic is injected in a predetermined amount into the cavity or molding nest (6) of a mold (5), during and/or upon which a fluid pressure medium (gas) is applied so that with the formation of the hollow space the molten plastic is distributed along and set against the walls of the cavity or molding nest. The pressure medium (gas) is fed into the cavity or molding nest (6) and into the molten plastic at first essentially only in the direction of flow of the molten plastic and in a quantity and/or at a pressure that causes a void (8) to form within the molten plastic, terminating at a distance from the end of the flow path. Then, with a time lag, more pressure medium (gas) at a higher or increased level of pressure is fed into the cavity and the molten plastic from the end of the flow path for the molten plastic and essentially counter to the direction of flow of the molten plastic, forming a second void (11) which joins with the already existing void (8).

4 Claims, 12 Drawing Sheets

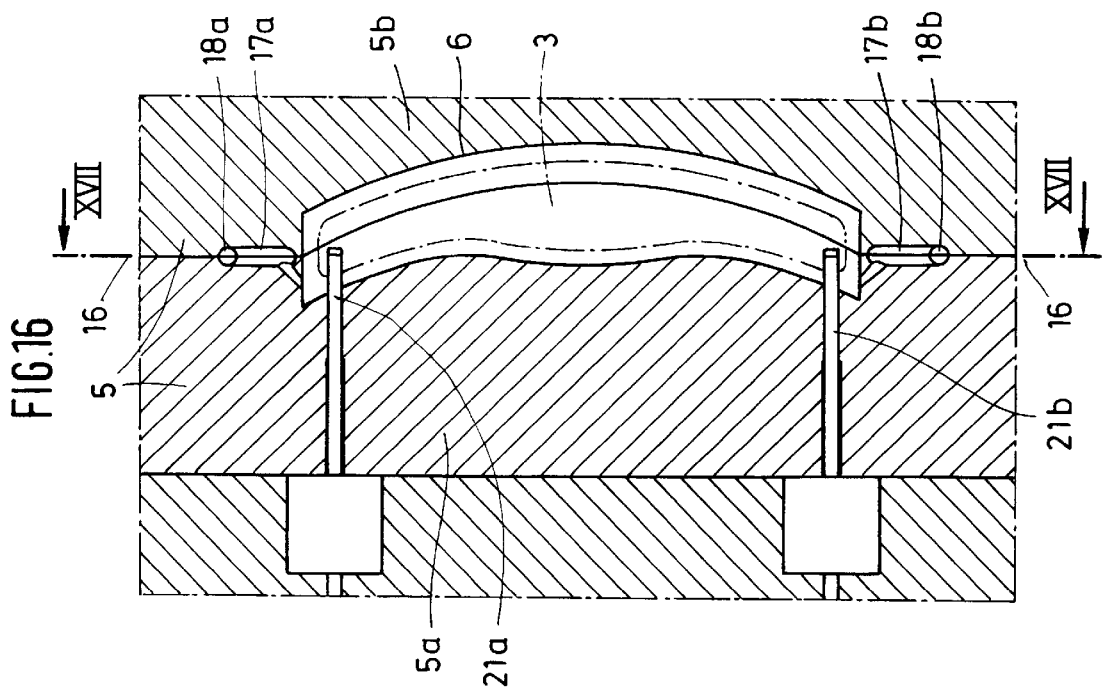
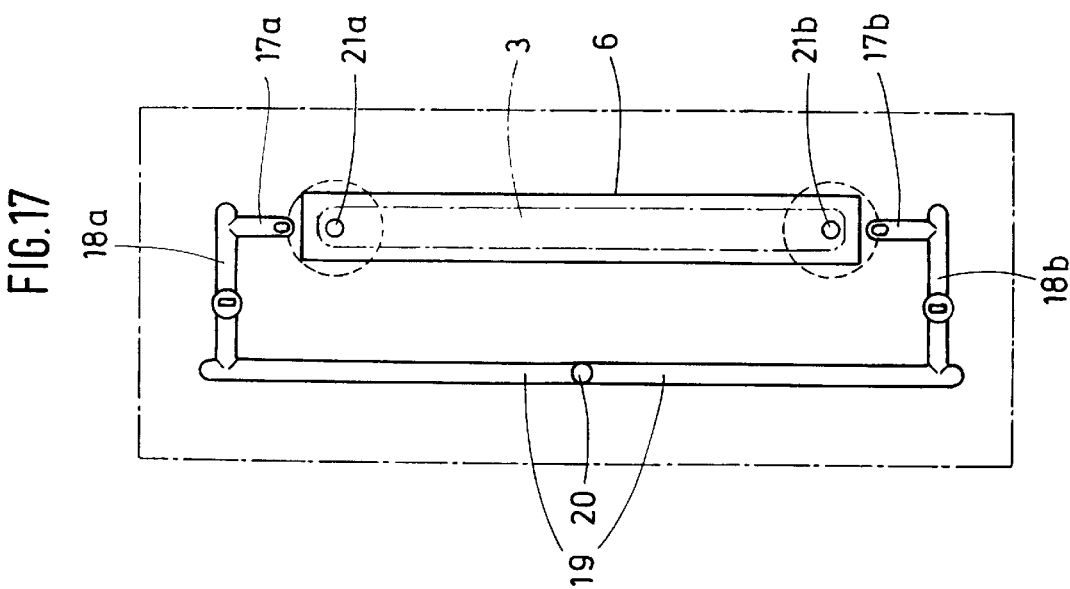

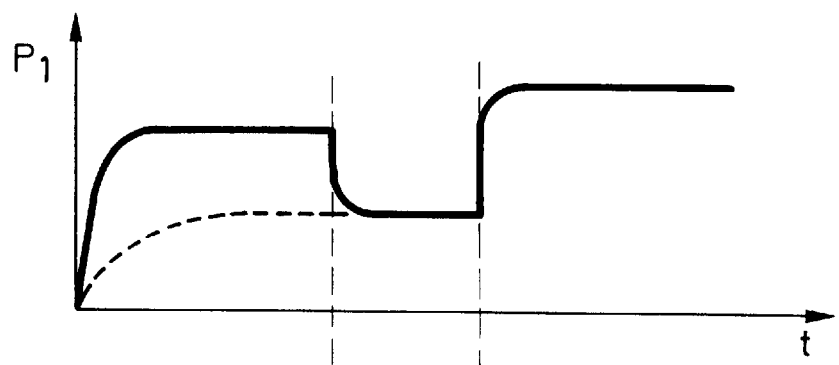
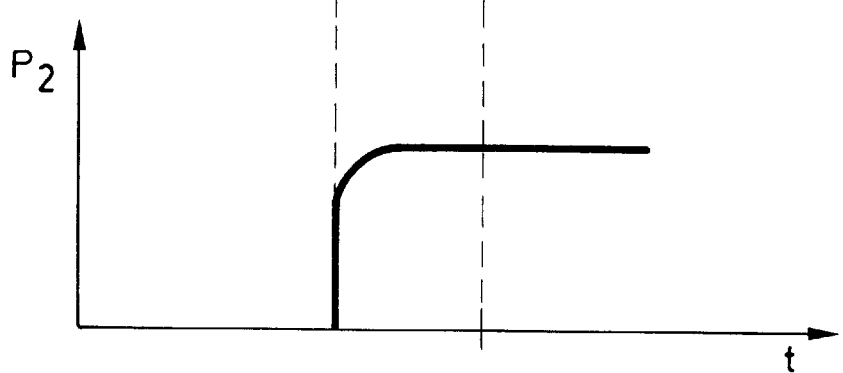
FIG.18
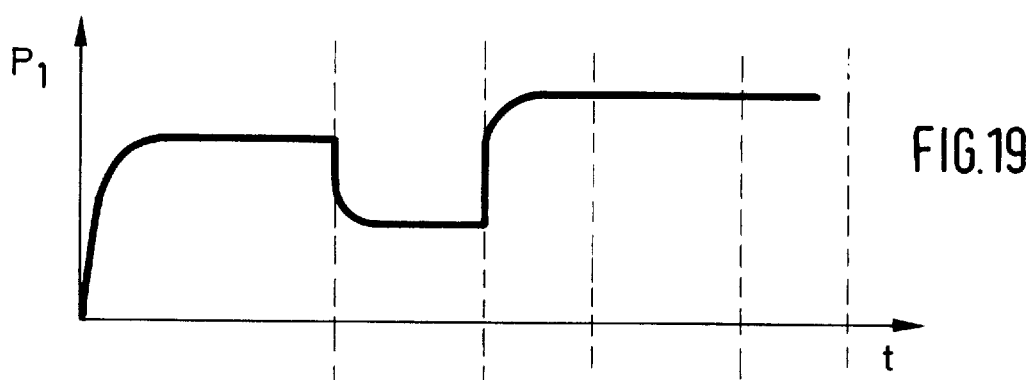
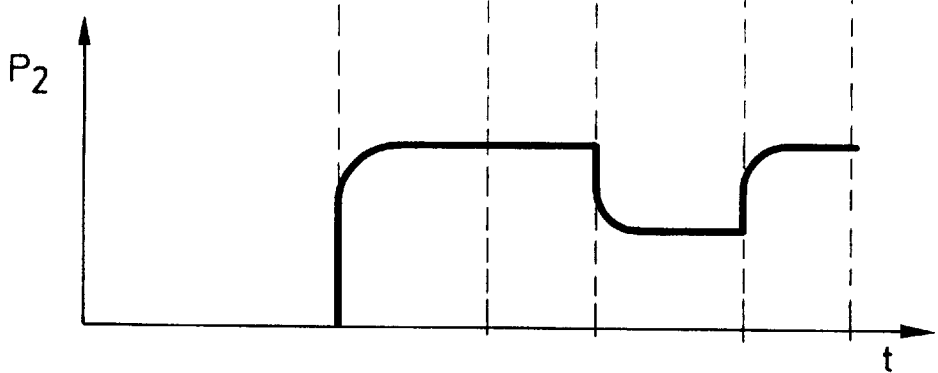
FIG.19

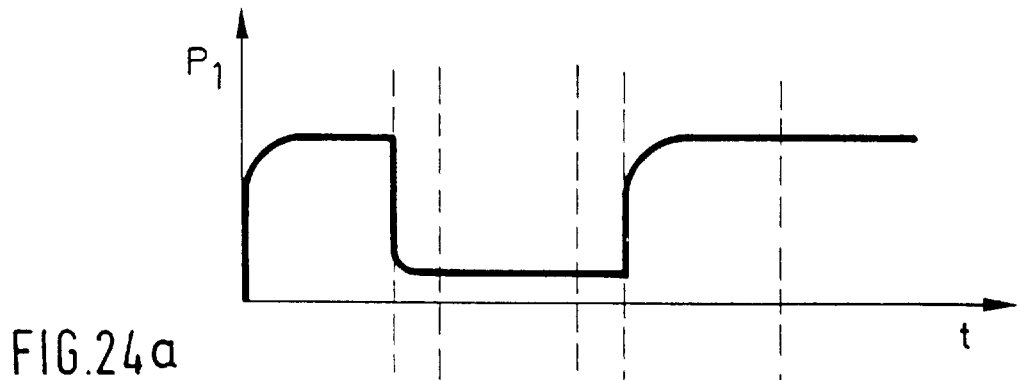
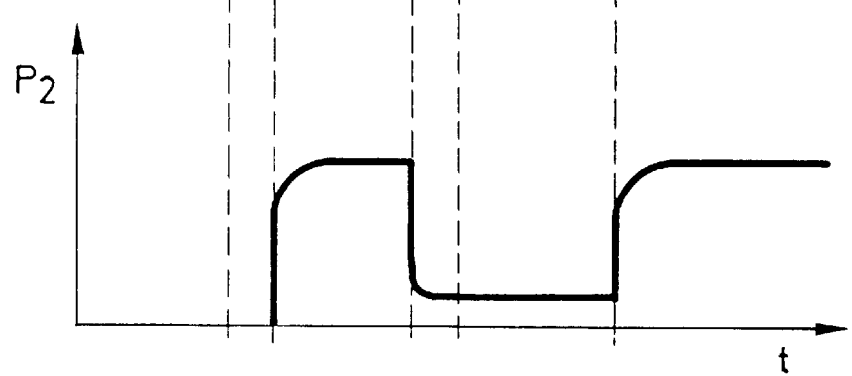
FIG.24a
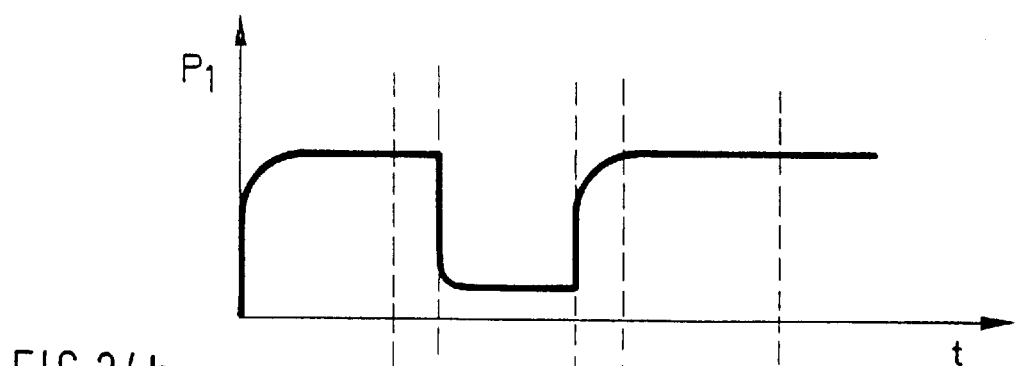
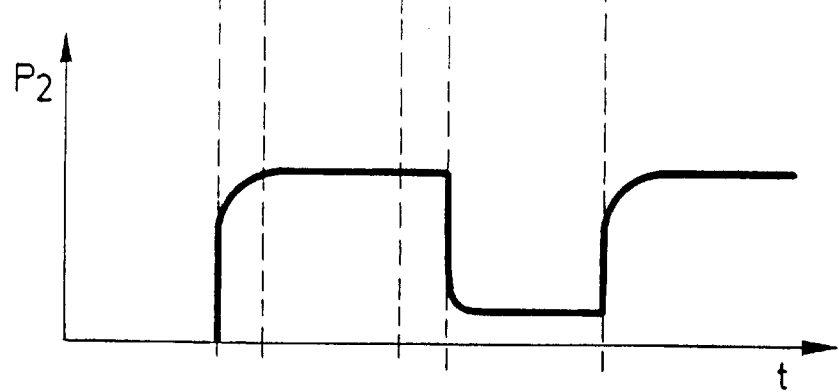
FIG.24b

METHOD FOR INJECTION MOLDING OF MOLDED PARTS OF THERMOPLASTIC MATERIAL

The invention relates to a method of injection molding of articles made of a thermoplastic material and having walls which enclose a hollow space, in which a predetermined amount of a plastic material melt is injected into a cavity of a mold and is subjected, simultaneously or subsequently, to an action of a fluid pressure medium, in particular gas, so that, with the formation of the hollow space, the plastic material melt is distributed along and is set against the cavity walls.

The invention also relates to a mold for effecting this method and in which the fluid pressure medium, in particular gas, can be fed into the mold cavity through an injection nozzle of the injection unit connected to the mold gate, or through an injection device located adjacent to the mold gate.

The injection molding of articles is often effected by injecting into mold cavity a predetermined amount of a thermoplastic material melt, which corresponds to the volume of the article, through an injection nozzle of an injection unit connected to the mold gate, with simultaneous or subsequent feeding into the cavity of the fluid pressure medium, in particular gas.

This manufacturing technique is designed for manufacturing objects which, while having relatively large dimensions, should be manufactured with as small amount of a plastic material as possible and, therefore, have an inside hollow space.

It is important that the articles have a certain wall thickness distribution, dependent on their geometry and the plastic material used for their manufacture, to thereby insure their necessary stability in accordance with the purpose of their use.

At the conventionally available manufacturing conditions, their influence on the wall thickness and, in particular, on the minimum wall thickness of an article is very small. That is the temperature of the thermoplastic material, the temperature of the mold walls, the injection speed, and the pressure of the fluid pressure medium, in particular gas, injected into the mold cavity for acting on the thermoplastic material, cannot guarantee an optimal wall thickness distribution and the minimum wall thickness in critical locations of a respective article.

Often it is important or it is required to produce an injection-molded article in which the minimum wall thickness in certain regions should not be reduced under any circumstance, in particular when these regions are regularly subjected to a high load.

The manufacturing of such articles up to the present was effected in the following manner, the mold cavity was completely filled with the thermoplastic material melt, and then a fluid pressure medium, in particular gas, was fed into the plastic material melt or into the cavity containing the same, in order to force out a portion of the liquid plastic material melt.

With such manufacturing of plastic articles, the portion of the thermoplastic material, which was forced out of the mold cavity with the fluid pressure medium, is either returned to the ante-chamber of the injection unit or is pushed into an overflow chamber adjacent to the mold cavity.

The problem with this consists in that the gate of the mold, which communicates with the injection unit, should remain open until the excess plastic material is forced out from the cavity by the action of the fluid pressure medium. Thereby, the course of each separate injection process would be adversely affected.

In another case, an outside control of the flow into the overflow chamber is absolutely necessary, i.e., the costs of producing and operating the mold increase. Namely, in addition, to the mold cavity itself, after each injection process, the adjacent overflow chamber should be cleared from the excess plastic material therein.

A drawback of both know techniques consists in that the portion of the thermoplastic material, which is delivered from the mold cavity to the ante-chamber of the injection unit or to the overflow cavity, can vary from shot to shot, and their results in a too large deviation of the weight of the finished article and in the accompanying quality deviation.

The object of the invention is not only to insure a purposeful control of the wall thickness distribution or the minimum wall thickness of the plastic article, but also to insure that only that volume of the thermoplastic material is injected into the mold cavity, which is necessary for the manufacturing of a respective article. Thus, the return flow of the thermoplastic material out of the mold cavity and into the ante-chamber of the injection unit and/or the mold overflow chamber at each injection cycle is avoided.

The set forth object, from the technical point of view, is achieved by:

effecting feeding of a pressure medium, in particular gas, into the cavity and then into plastic material melt essentially only in the flow direction of the plastic material melt, and in an amount and/or under a pressure necessary to form a void inside the plastic material melt, which is spaced from the flow path ends, and by feeding, preferably with a time delay, a further pressure medium in particular gas, having a higher or increased pressure level, into the cavity and into the plastic material melt in a direction substantially opposite to the flow direction of the plastic material melt whereby a second pressure medium void is formed and is united with the already produced first void.

With this process, a portion of the thermoplastic material melt, which was injected into the mold cavity, is forced to flow, from the flow path end, in a direction opposite to its initial flow direction, so that a bridge, consisting of the thermoplastic material, between the two pressure medium voids is ripped open, whereby an optimal wall thickness distribution of the plastic material takes place.

It was found out that a desired minimum wall thickness for an article even at the end of the flow path for a thermoplastic material can be determined in a simple way by varying, in accordance with the invention, the time delay between the injections of the two pressure media. Another result consists in that with following one another injection shots, the finished article has a high weight constancy because, according to the invention, only that amount of the plastic material is injected into the mold cavity which is required for producing a corresponding article. An important improvement of the process according to the invention consists in that with the union of both pressure medium voids, the dwell pressure pressure level is determined and then retained until the removal of the article form the mold takes place.

In the simplest case, the dwell pressure pressure level can correspond to the higher or increased pressure level of the second pressure medium injection and is retained for the thermoplastic material from the flow path end. It is also possible to apply the dwell pressure pressure level from the injection side of the plastic material, by switching, after the finish of the second injection of the pressure medium, its higher pressure level to the injection side for the thermoplastic material melt.

In each case, it can be important if the dwell pressure pressure level can be varied after the union.

According to the process technology, the pressure medium, acting in the flow direction of the plastic material melt, can be fed through the nozzle or the gate either together with the plastic material melt with time overlapping, or immediately after its injection. Likewise, it can be proved to be advantageous if the plastic material melt and the pressure medium acting in its direction are injected simultaneously at several locations.

It can also be advantageous if the pressure medium, acting in the flow direction of the plastic material melt, is separated from the plastic material melt but is injected there into adjacent to the gate, wherein the possibility exists, also in this case, to inject the plastic material melt and acting in its flow direction pressure medium simultaneously at several locations.

According to the invention, there is provided a mold for effecting the method wherein the fluid pressure medium is fed into the cavity through an injection nozzle of the injection unit, which is connected to the gate, or through an injection unit located adjacent to the gate, and which is characterized in that one or several injection units for the pressure medium, in particular gas, is connected to an end of the mold cavity remote from the gate. Obviously, it is also possible to use molds in which the one and the same cavity is equipped with several injection locations for the thermoplastic material and several feeding locations for the pressure medium, with the injection units for the pressure medium, acting in the flow direction of the plastic material melt, being located adjacent to the gates and with the pressure medium acting in a direction opposite to the flow direction of the plastic material melt, being located remotely from the gates. The simultaneous supply of several gate locations with thermoplastic material can be effected as through a corresponding number of nozzles so through one nozzle through distribution channels, which can be formed either as hot channels or as cold channels.

According to the invention, the injection-molded articles can be produced in a simply designed mold, with retaining, even when having a complicated shape, an optimal wall thickness distribution or the minimum wall thickness over their entire area and, therefore, can be optimally used for their intended purpose.

Obviously, the process according to the invention can be carried out not only with molds which have only one cavity. Rather, it can be carried out with molds in which several cavities are provided.

Finally, there may be cases of the application of the process technology according to the invention in which, from pure technical reasons, it is not possible to effect the injection of the further pressure medium, which acts in a direction opposite to the flow direction of the plastic material melt, directly at the flow path end in the cavity, which correspond to the exact shape of the article.

In such cases, however, there exists a possibility to provide, at the flow path end of the cavity proper, which corresponds to the article shape, a minimal additional volume inside of which a so-called "waste loss" of an article is formed. Into the region of this additional volume of the cavity, during each injection process, the further pressure medium, which acts in a direction opposite to the flow direction of the plastic material melt, can be advantageously injected. The "waste loss" can be easily and without any problem cut off the finished article after its removal from the mold.

Figure 2:
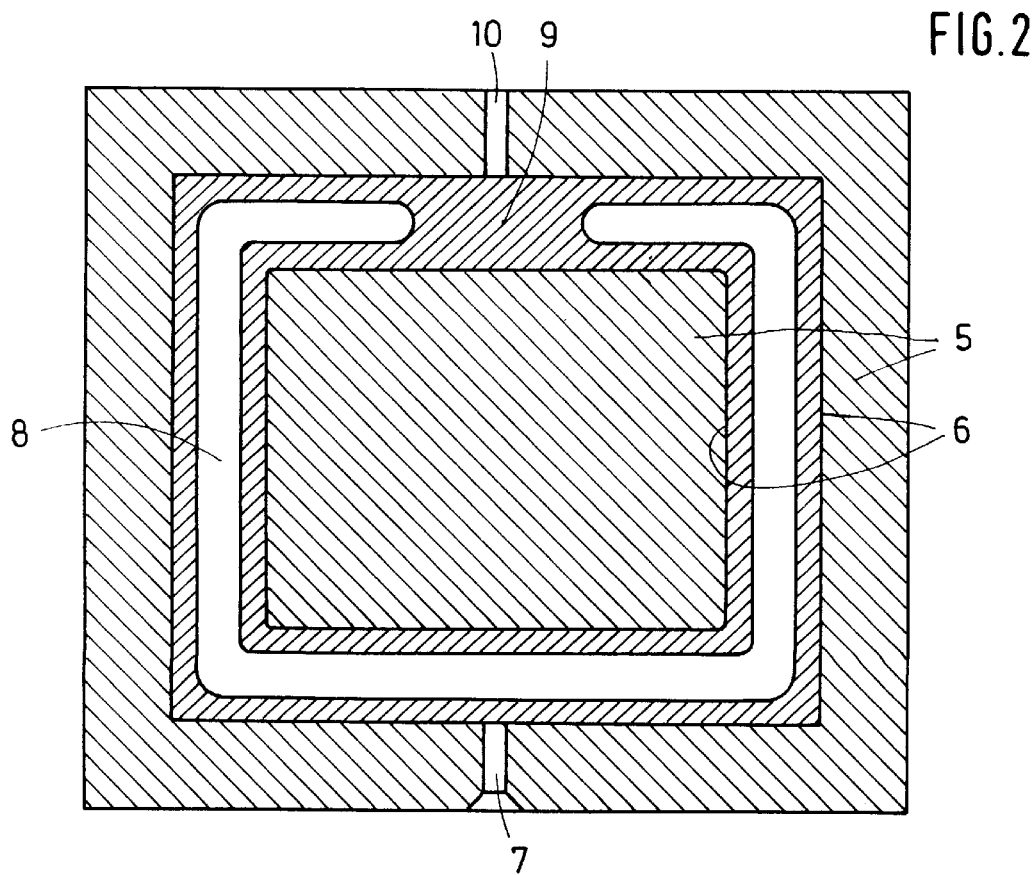
Figure 3:
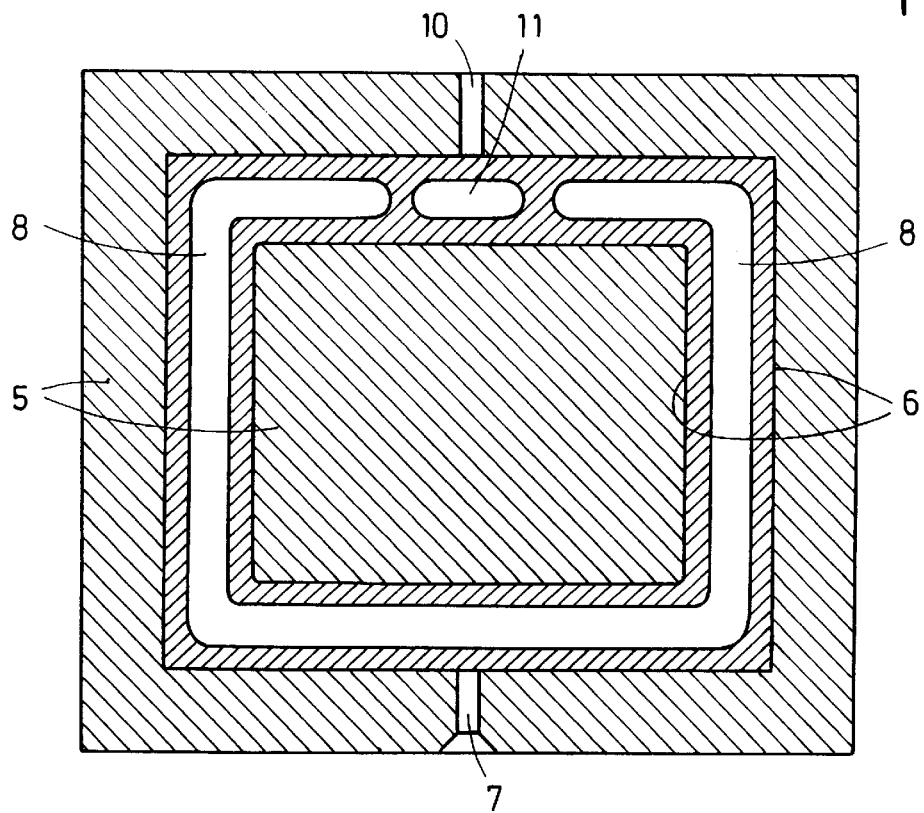
Figure 4:
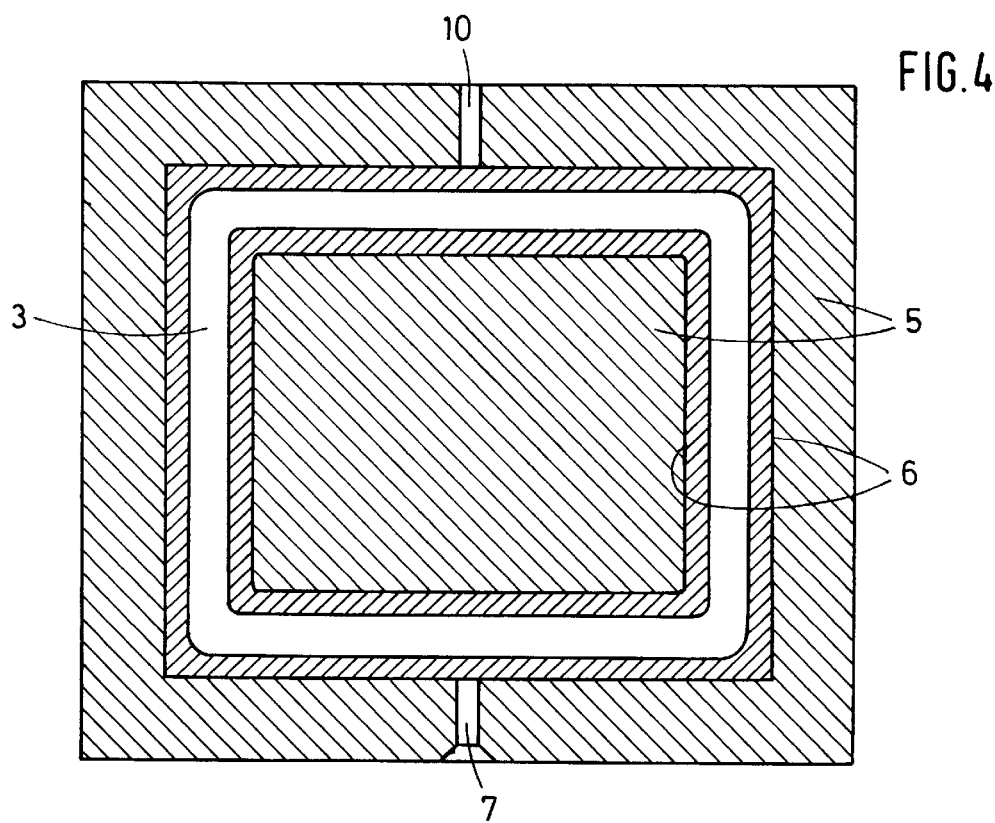
Figure 5:
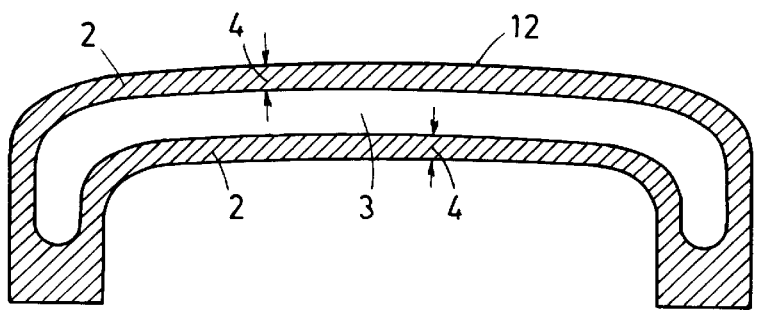
Figure 6:
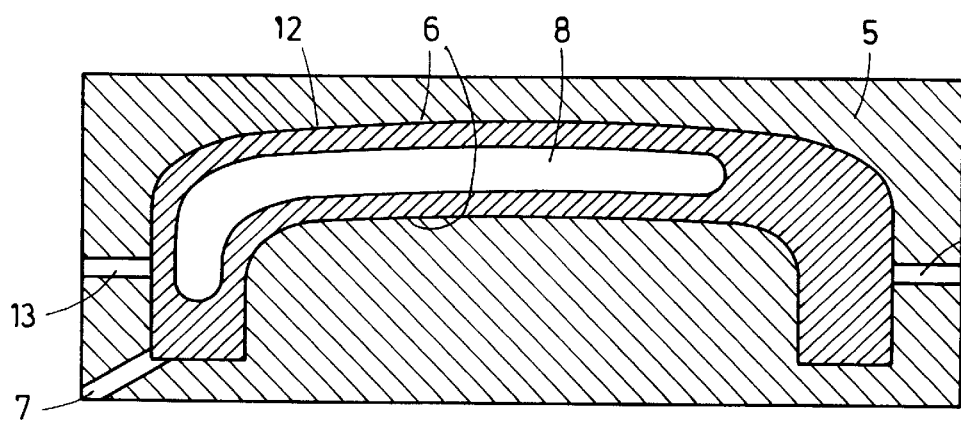
Figure 7:
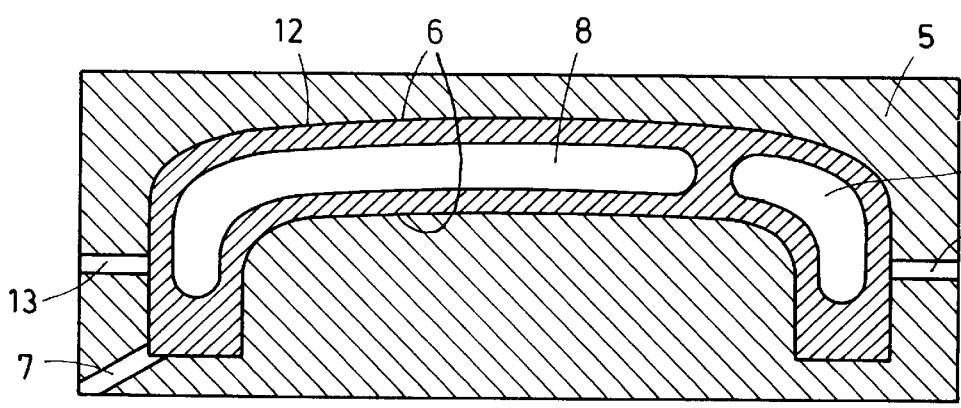
Figure 8:
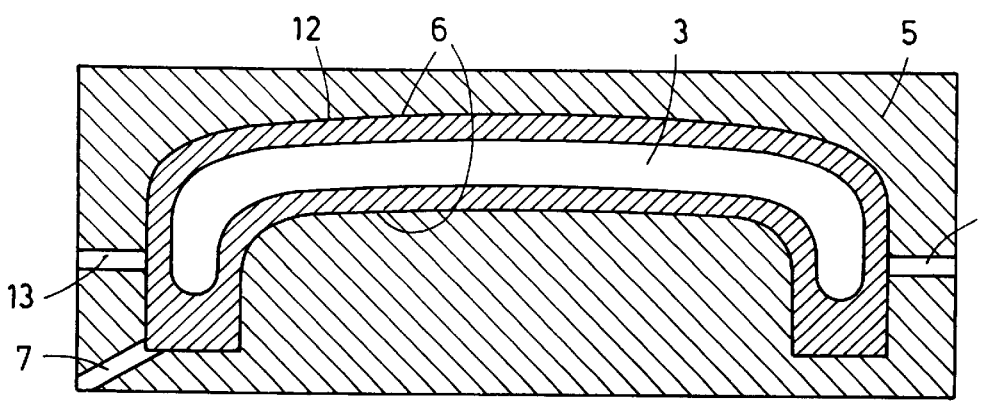
Figure 9:
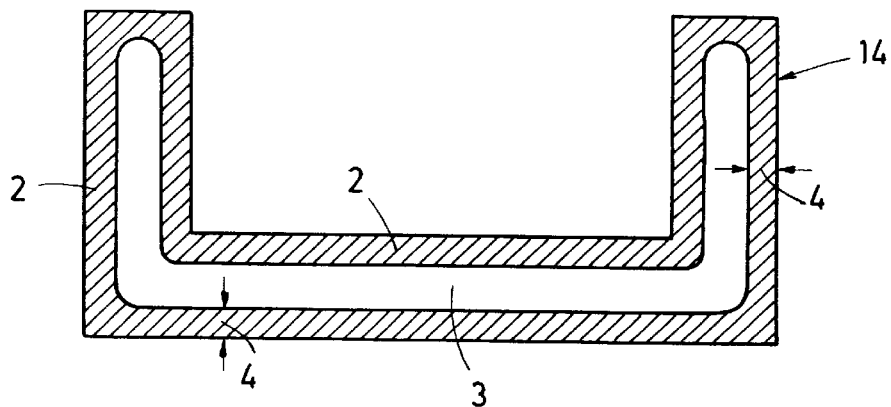
Figure 10:
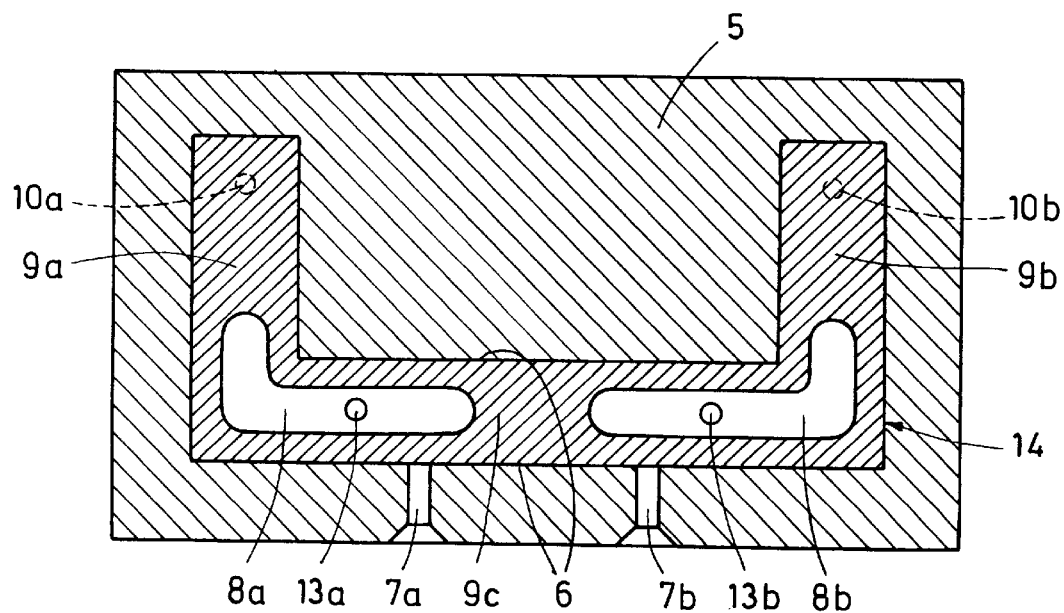
Figure 11:
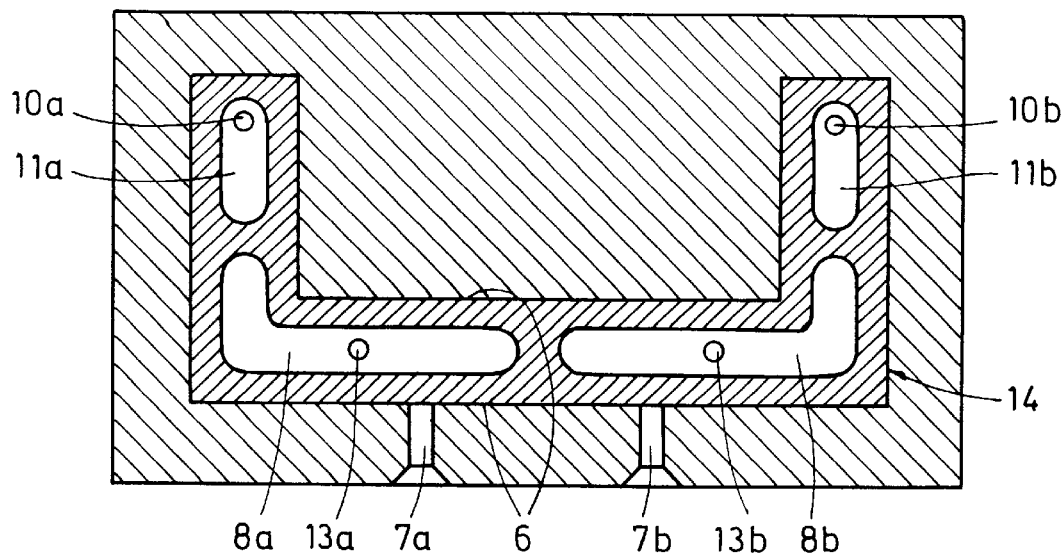
Figure 12:
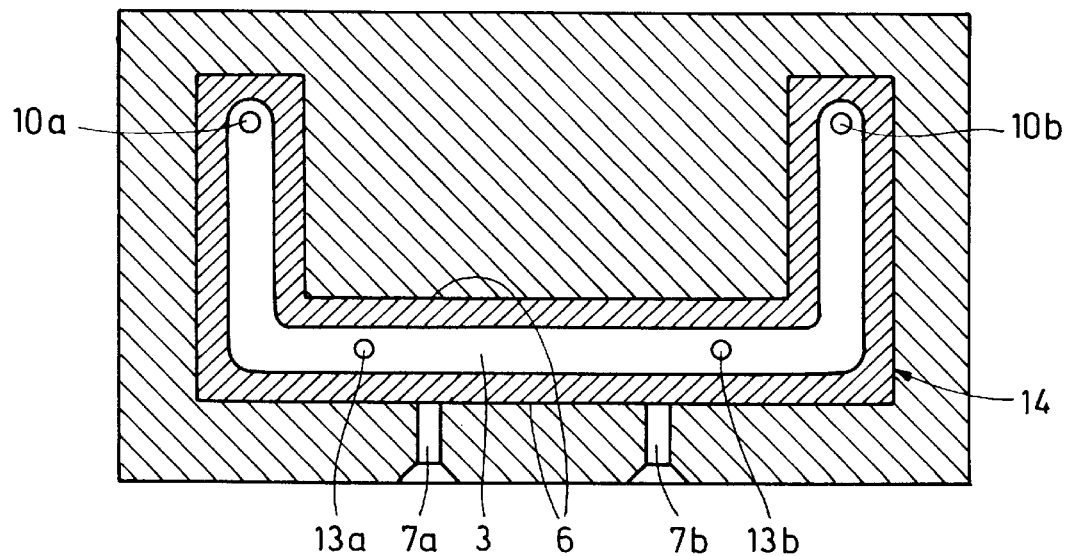
Figure 13:
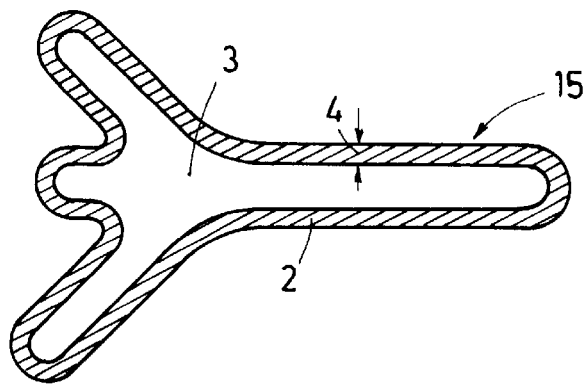
Figure 14:
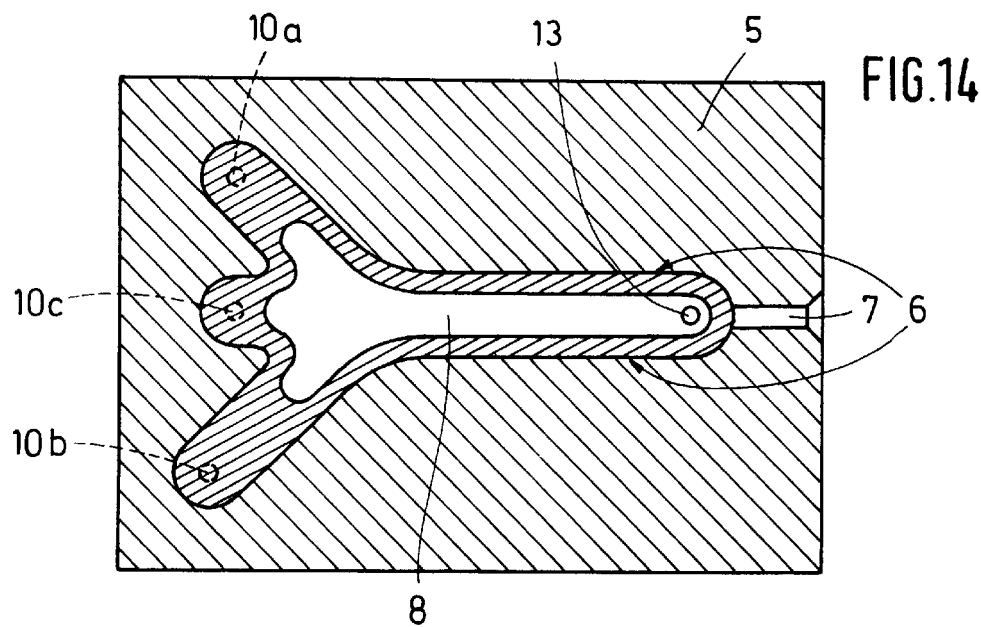
Figure 15:
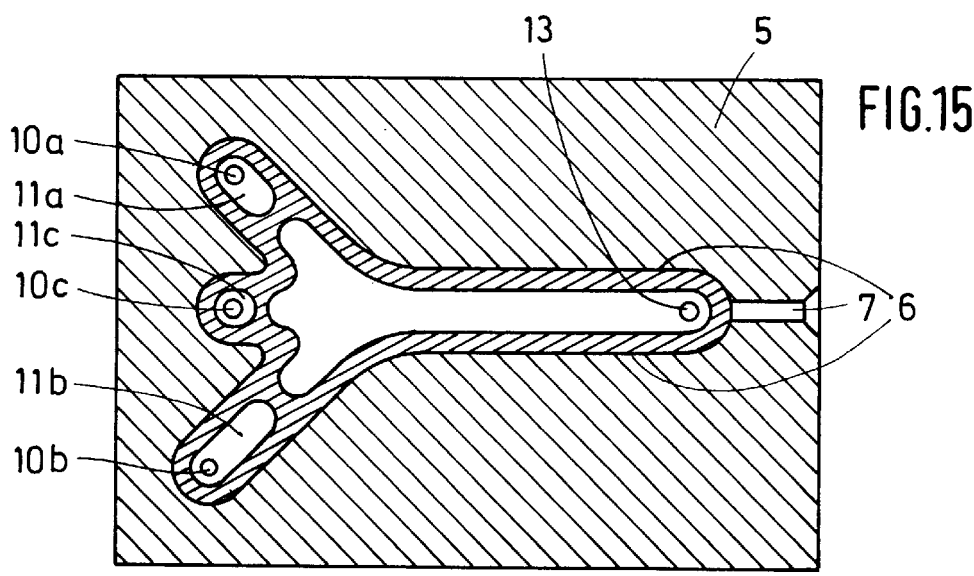
Figure 20:
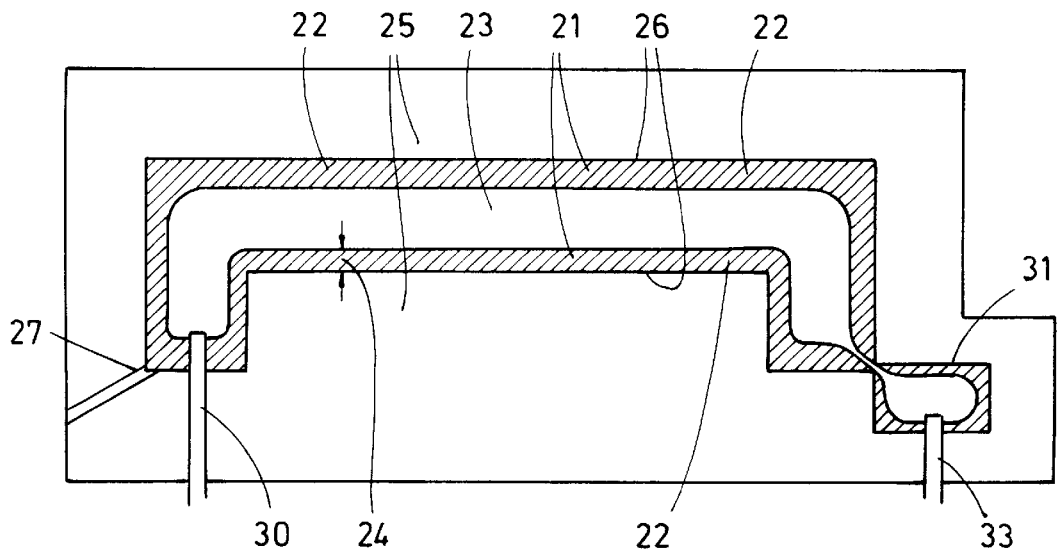
Figure 22:
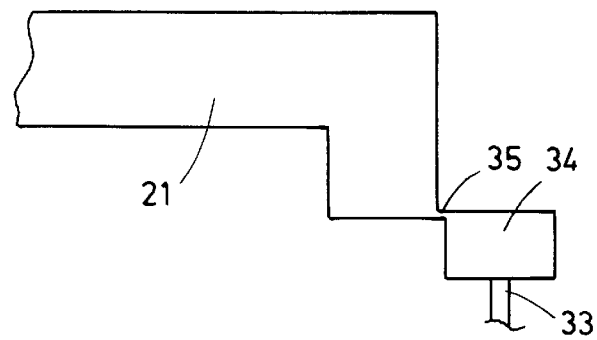
Figure 21:
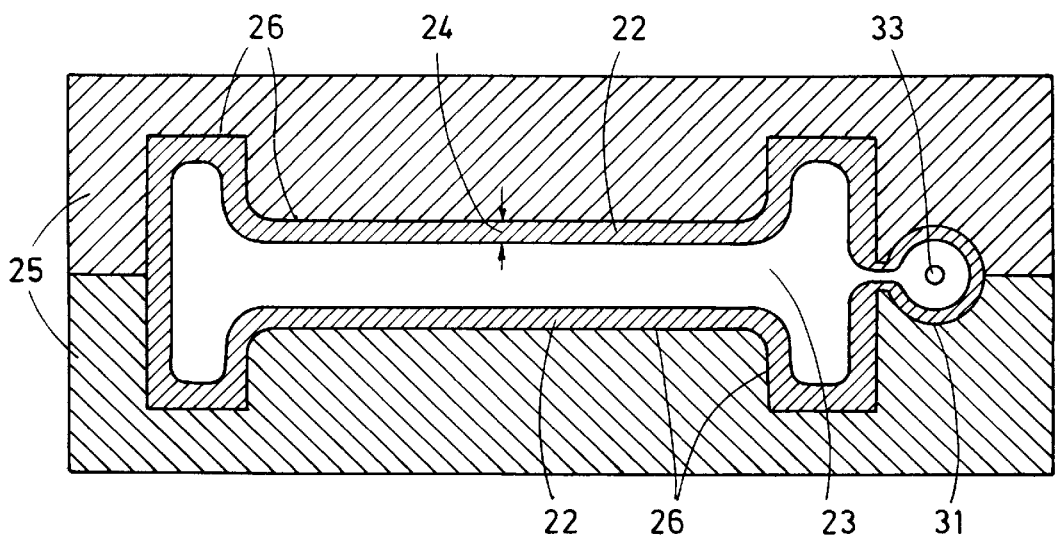

The embodiments of the subject matter of the invention will be described in more detail below with reference to the drawings, wherein:

FIG. 1 shows a frame-like injection-molded article with a hollow space having likewise a frame-like shape and surrounded from all sides by walls, FIG. 2 shows a schematic simplified view of the execution of a first step of a process for manufacturing of the article shown in FIG. 1, FIG. 3 shows beginning of a second step of the process for manufacturing the article according to FIG. 1, FIG. 4 shows finishing of the second step of the process for a manufacturing the article according to FIG. 1 and start of the third step of the manufacturing process, FIG. 5 shows a bow-like injection-molded plastic article which is manufactured according to the inventive process, FIG. 6 shows in schematic simplified manner a first step of the manufacturing process for producing the article according to FIG. 5 (the indication of "4" in the German text in the description of this Figure and FIGS. 7 and 8 is an obvious error-translator's remarks), FIG. 7 shows the start of a second step of the process of manufacturing the article according to FIG. 5, FIG. 8 shows the finishing of the second step and the start of a third step of the process of manufacturing the article according to FIG. 5, FIG. 9 shows a mold for manufacturing a somewhat U-shaped injection-molded article having a hollow space corresponding to the shape of the article and surrounded from all sides with walls, FIG. 10 shows a schematic simplified view of the first step of the process for manufacturing the article according to FIG. 9, FIG. 11 shows the start of a second step of the process for manufacturing the article according to FIG. 9, FIG. 12 shows the finishing of the second step and the simultaneous start of the third step of the process for manufacturing the article according to FIG. 9, FIG. 13 shows a cross-section of a somewhat fork-like article having a hollow-space having a shape corresponding to that of the article and surrounded from all sides by walls, FIG. 14 shows a schematic simplified view of a first step of the process of manufacturing the article according to FIG. 13, which takes place in a mold, FIG. 15 shows the start of a second step of the process of manufacturing the article according to FIG. 13, FIG. 16 shows a detailed cross-sectional view of a portion of an injection mold for manufacturing a handle, made substantially according to the invention, FIG. 17 shows a view in the direction of arrows XVII—XVII of the separation plane of the injection mold according to FIG. 16, FIGS. 18 and 19 show two diagrams which show the pressure ratios and the pressure change during feeding of the two fluid pressure media into the thermoplastic melt or the mold, FIGS. 20 to 22 show by way of example a modified process of manufacturing of an injection-molded plastic article having a closed hollow space, FIGS. 23 to 25 show again diagrams which show the pressure ratios and the pressure change during feeding of pressure media for further operations for manufacturing of injection-molded plastic articles.

FIG. 1 shows an example of a frame-like injection-molded plastic article 1, which encloses a likewise frame-like hollow space 3 with walls 2 of legs 1a, 1b, 1e, 1d in such a way that all wall 2 have as uniform as possible distributed thickness, namely, a minimum wall thickness 4.

For manufacturing of the frame-like injection-molded plastic article according to FIG. 1, a mold 5, shown in FIGS. 2–4, is used and which is formed in a conventional manner, i.e., it has, in its interior, a cavity 6 corresponding to the outer contour of the injection-molded plastic article 1.

It is of course possible to use the molds 5, which have a plurality of cavities 6, and thereby simultaneously manufacture a plurality of injection-molded articles 1.

The mold 5 is provided with a gate which opens into the cavity 6 and to which an injection nozzle of an (not shown) injection-molding unit of an injection molded machine can be connected.

A predetermined amount of a thermoplastic material melt, which is necessary for manufacturing of the injection-molded plastic article 1 is injected into the cavity 6 of the mold 5 through the gate 7. In addition, a fluid pressure medium, in particular gas, is injected under pressure through the gate 7 into the cavity 6 of the mold 5 and thereby into the thermoplastic material melt in a time overlapping manner with the injection of the thermoplastic material and/or thereafter.

The pressure medium, which is injected through the gate, is injected in an amount and under pressure sufficient for distributing of the molten plastic material along the limiting walls of the cavity 6, as indicated in FIG. 2 of the drawings. Inside of the molten thermoplastic material, thereby, a void 8, filled with the pressure medium, is formed, which provides for forming of a hollow space 3 inside of the injection-molded plastic material 1.

The amount and the pressure of the pressure medium, which is injected through the gate 7 should be sufficient for forming the void 8 in the molten thermoplastic material, but should not be such that the pressure medium can reach the rear end of the of the flow path of the thermoplastic material melt. Thereby, a large portion 9 remain in the thermoplastic material melt, as can be seen in FIG. 2. The length of the void 8 depends, first of all, on the amount of the thermoplastic material injected during each injection process (shot). Thus, when a large amount of the plastic material is injected, there remain only a correspondingly smaller possibility for forming the void 8, and vice versa. The large portion 9 of the thermoplastic material melt at the rear end of the flow path is eliminated, whereby inside the injection-molded plastic material article 1 a hollow space 3 is formed, as required, when a further pressure medium, e.g., gas or air is injected, with a predetermined preferably variable time-delay, through a channel 10, which is provided at a location opposite to the gate 7 adjacent to the portion 9, into the cavity 6 of the mold 5. Thereby, a void 11 is formed in the portion 9 of the thermoplastic material melt, as can be seen in FIG. 3. The pressure of the pressure medium of the void 11 is at a level, which at least slightly exceeds the pressure level of the pressure medium in the void 8. Thereby, the void 11 increases, because of displacement of the thermoplastic material melt in a direction opposite to the initial flow direction, until it breaks through the void 8, whereby the pressure medium of both voids 8 and 11 is united, as can be seen in FIG. 4. Thereby, a portion of the hollow space 3 will be formed in the portion 9 of the plastic material melt, with the high pressure level of the pressure medium, accumulated in the void 11, being used for subjecting the plastic material, by the pressure in the hollow space 3, to a dwell pressure until the plastic material would solidify and form the walls 2 of the injection-molded plastic article 1. The dwell pressure can be varied within predetermined limits to achieve optimal injection results.

FIGS. 5–8 show that a bow-like injection-molded plastic article 12 with uniform wall thickness distribution and a predetermined minimum wall thickness 4 can be manufactured by the same process and in the same way, as it was discussed, with reference to FIGS. 1–4, for manufacturing of the frame-like injection-molded plastic article 1. However, in this case, the mold 5 with the cavity 6 has a shape different from the mold 5 of FIGS. 2–4 because feeding of the fluid pressure medium for forming the void 8 is effected not through the gate 7, which serves for the injection of the thermoplastic material melt. Rather the pressure medium, which is necessary for forming the void 8, is injected through an additional channel 13, which is provided adjacent to the gate 7 but extends into the cavity 6 of the mold 5 independently of the gate 7.

The mold 5, which is shown in FIGS. 6–8 of the drawing, has only one gate 7 for injecting a thermoplastic material melt into the cavity 6 of the mold 5. Also, a single channel 13 for injecting the pressure medium for forming the void 8 and a single channel 10 for injecting pressure medium for forming the void 11 are available, with the channel 13 being located adjacent to the gate 7 and the channel 10 being located at the opposite end of the cavity 6.

FIGS. 9–12 show manufacturing of an injection-molded plastic article 14 which, e.g., has a substantially U-shaped form. The drawing shows that the cavity 6 is fed with a thermoplastic material melt not only through two different gates 7a and 7b. Rather, these are also provided two channels 13a and 13b for injecting the first pressure medium, and two channels 10a and 10b for injecting the second pressure medium.

With the injection of the first pressure medium through the channels 13a and 13b into the cavity 6, two middle voids 8a and 8b are formed in the thermoplastic material melt next to each other, which extend not only in a direction toward each other, but also in the direction toward the flow path ends of the cavity 6 along the cavity perimeter, as it can be seen in FIG. 10. However, at the ends of the flow path, two large portions 9a and 9b of the thermoplastic material melt, respectively, and a similar large portion 9c of the thermoplastic material melt between the voids 8a and 8b are formed, as it again can be seen in FIG. 10. When a further pressure medium is injected under an increased pressure through channels 10a and 10b adjacent to the flow path ends, two further void 11a and 11b, containing the further pressure medium, are formed there, due to the displacement of the thermoplastic material melt in a direction toward the adjacent voids 8a and 8b. A necessary condition for uniting the medium pressure voids consists in that a sufficiently large pressure difference should be provided between the respective voids.

With the expansion of the both medium pressure voids 11a and 11b, lengthening of the two pressure medium voids 8a and 8b in opposite direction toward each other takes place, and in such a way, that not only pressure medium voids 11a and 8a and 11b and 8b are united with each other but, in addition, merging of the pressure medium void 8a and 8b occurs, whereby a hollow space 3 is formed, as can be seen in FIG. 12.

FIG. 13 shows an injection-molded plastic article 15 which has a substantially fork-like shape, and the walls 2 of which enclose a hollow space 3 which extends into the (four) fork legs, with the walls 2 having a predetermined minimum thickness 4.

For manufacturing the injection-molded plastic article 15, a required amount of a thermoplastic material melt is injected into the cavity 6 of the mold 5 through the gate 7. Thereafter, a fluid pressure medium is injected or fed into the cavity 6 of the mold 5 and, consequently, into the thermoplastic material melt through a channel 13 located adjacent to gate 7, and essentially in the flow direction of the thermoplastic material melt. Thereby, a void 8 is formed in the fork leg of the article 15 which increases toward other legs, as it can be seen in FIG. 14. The pressure medium void, however, cannot extend into the other legs of the article 15, or can extend only insignificantly.

Into each of the fork legs extending toward the flow path ends of the cavity 6, a channel 10a, 10b and 10c opens which is fed with a further pressure medium. With the further pressure medium, separate pressure medium voids 11a, 11b and 11c are formed, which increase, at the available pressure ratio, in the direction toward the void 8 and, finally, break therethrough. Thereby, a finished injection-molded plastic article 15 according to FIG. 13, which has a relatively large hollow space 3 closed with walls 2 having a minimum wall thickness 4.

Purely schematic views of FIGS. 1–15 make it clear that a time delay feeding, substantially in opposite directions, of two pressure media into a mold cavity, which is filled with a thermoplastic material melt, dependent on the shape of a respective article, can take place at completely different locations. The number and the arrangement of the location, at which the pressure medium is fed, can be varied dependent on the requirement and, in particular, are selected in accordance with the complexity of the article and the flow characteristics of the plastic material used for manufacturing the article.

In the drawing Figures discussed up to now, the shown mold 5 is formed in such a way that its gate 7, 7a or 7b is directly connected with a respective injection nozzle of the injection machine.

FIGS. 16 and 17 show a detailed view of an injection mold 5, the cavity 6 of which is enclosed between two mold halves 5a and 5b, which abut each other along a separation plane 16—16. The cavity 6 defines a small, elongate and arcuate hollow space into which, at ends thereof remote from each other, gates 17a and 17b respectively open. Each of the gates 17a and 17b communicates with a branch channel 18a, 18b, respectively, of a distribution channel 19 which is fed from a connecting channel 20 to which a nozzle of the injection unit is attached. During the injection of the thermoplastic material melt into the cavity 6 of the mold 5 through the gates 17a and 17b, hollow needles 21a and 21b are inserted into the mold 5, e.g., into the mold half 5a, at different locations for feeding a pressure medium into the cavity 6 and into the thermoplastic material melt filling the cavity. These needles 21a and 21b are made either stationary, i.e., they constantly project, with their free ends, into the cavity 6 (FIG. 16) or are axially displaceable and project, with their free ends, into the cavity 6 only temporary. With reference to the foregoing description, in which feeding of the fluid pressure medium through the channels 10, 10a, 10b, 10c, 13, 13a and 13b was discussed, it should be self-evident that instead of forming of the pressure medium injection or feeding channels, hollow needles, so-called injection blocks can be used, as it will be described hereinafter.

The diagram in FIG. 18 shows the dependence of pressure on time, when the both pressure media act on the thermoplastic material melt filling the mold cavity to form in the infection-molded plastic article a hollow space 3 with a uniform minimum wall thickness 4.

The upper pressure curve in FIG. 18 characterizes a pressure change of the pressure medium itself which is fed to the medium pressure void 8, whereas the lower pressure curve in FIG. 18 corresponds to a pressure change acting through the pressure medium void 11. Here, it can be recognized that after the two pressure medium voids 8 and 11 are united, i.e., after the formation of the hollow space 3, a dwell pressure remains in the injected-molded plastic article, which is formed of at least both component pressures P1 and P2 and, preferably, is maintained, however at the higher level of the second component pressure P2.

While according to FIG. 18, only the component pressure P1 temporary falls down, namely, during the build-up of the pressure P2 in the pressure medium void 11, in the diagram of FIG. 19, lowering of the pressure P2 is envisaged, and therefore, after a relatively short period of the dwell pressure resulting from the action of both pressure components P1 and P2, lowering and then increasing of the pressure P2 of the second pressure component takes place.

In deviation from FIG. 18, it is possible to obtain the two pressure curves with a time shift. Thus, it is possible that after the lowering of the pressure of the first (upper) pressure curve, the pressure of the second (lower) curve increases, after a certain time interval.

For all of the above-discussed examples of the embodiments, a single prerequisite exists for a mold 5 for manufacturing of injection-molded plastic articles with walls enclosing a hollow space 3, which consists in that at least one additional feeding unit for a pressure medium should be connected to a channel provided at the end of the cavity 6 remote from the gate 7.

After the time period of the dwell pressure and solidifying of the injection-molded plastic article, a pressure balance in the hollow space 3 can be aimed for and be provided by the hollow needles 21a and 21b, projecting thereinto of the injection units. If needed, the pressure balance can be simultaneously produced in one or several locations.

Molds 5, which are provided with a shut-off arrangement acting against the screw ante-chamber of the injection unit and/or overflow chambers located adjacent to the cavity, are, however, not required.

Because the recovery time between the injections of the pressure media into the cavity 6 of the tool 5 can be varied, the thickness, in particular, the minimum wall thickness of the injection-molded article 1, 12, 14 or 15 can also be determined in the region which lies, in the direction of flow of the plastic material melt, at the rear end of the flow path, i.e., far away from the gate 7 of the mold 5 in question.

Finally, the following should be said:

There also exists a possibility to feed the pressure medium which acts in a direction opposite to the flow direction of the thermoplastic material melt, into the cavity 6 at several different locations. For the union of different pressure medium voids 8 and 11, 8a, 8b and 11a, 11b, 11c, it is important that a pressure difference exists between the adjacent voids, so that the plastic material 9 is displaced for passing of the pressure medium between the adjacent voids. For the union of more than two voids, as shown in FIGS. 9–15, it is important that between all of the pressure medium voids a sufficient pressure difference exists.

With the variation of pressures shown in FIG. 19, it is possible to obtain a predetermined mutual pressure difference between the first pressure medium voids 8a and 8b and the second pressure medium voids 11 or 11a and 11b, and, thereby the migration of the pressure media through the plastic material can be reliably insured, so that the large portions 9 or 9a, 9b, 9c of the thermoplastic material are reliably eliminated or broken through.

On the basis of FIGS. 20–22 of the drawings, a somewhat modified possibility of manufacturing injection-molded plastic articles will be now explained. First of all, it should be indicated that in many cases it is not possible, from the purely technical reasons, to provide for feeding of a further pressure medium into the cavity 26 of the mold 25, which corresponds exactly to the shape of the injection-molded plastic article 21, in a direction opposite to the flow direction of the plastic material melt. The injection-molded plastic article 21 has a substantially U-shape which is determined by the cavity 26 of the mold 25. First, the thermoplastic material melt is injected into the cavity 26 through the gate 27. In the vicinity of the gate 27, the first pressure medium is fed through the channel 30 into the cavity 26 of the mold 25 and, thus, into the plastic material melt filling the cavity. This first pressure medium acts in the flow direction of the plastic material melt and provides by forming the walls 22, for obtaining as uniform thickness distribution as possible, namely, of the minimum wall thickness 24 along the contour of the cavity 26.

At the end of the cavity 26 of the mold 25, remote from the gate 27 and the channel 30, there is provided an additional channel 33 which does not open directly into the cavity and through which a further medium acting in a direction opposite to the flow direction of the plastic material melt, is fed. As it is clearly shown in FIGS. 20 and 21, an additional volume 31 is provided next to the cavity 26, which corresponds to the shape of the infection-molded article, and into which the channel 33 for feeding the further medium opens.

The further pressure medium, which is fed through the channel 33 into the cavity 26 proper, acts on the thermoplastic material melt filing the cavity in a direction opposite to the flow direction of the plastic material melt. Thereby, in the region of a flow path end of the thermoplastic material melt with the formation of the hollow space, walls 22 are formed along the contour of the cavity 26. Meanwhile, a small portion of the plastic material melt enters the additional volume 31 from the cavity 26, so that the infection-molded plastic article is formed with a "waste coss" 34, as the additional volume 31 is not necessary any more for passage of the further pressure medium into the cavity 26.

After the injection-molded plastic part 21 is formed, the so-called "waste coss" 34 in the region fo the weak point 35 is separated from the injection-molded plastic article 21, as it is shown in FIG. 22.

Figure 23:
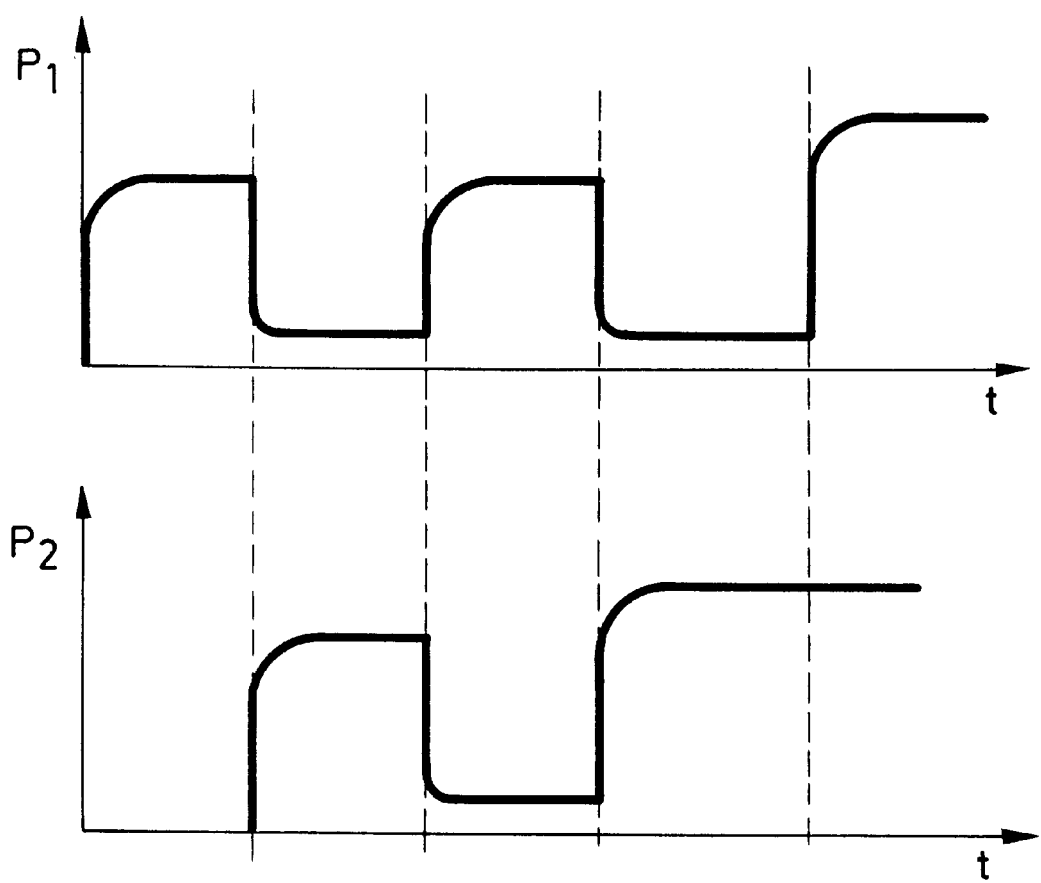
Figure 25A:
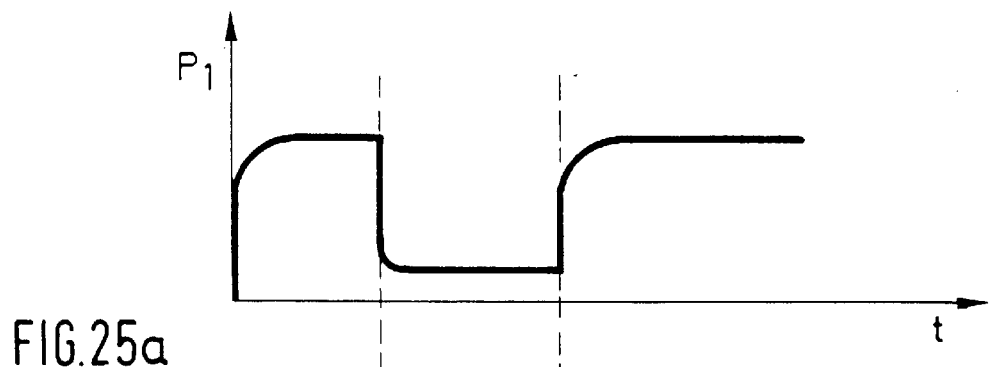
Figure 25B:
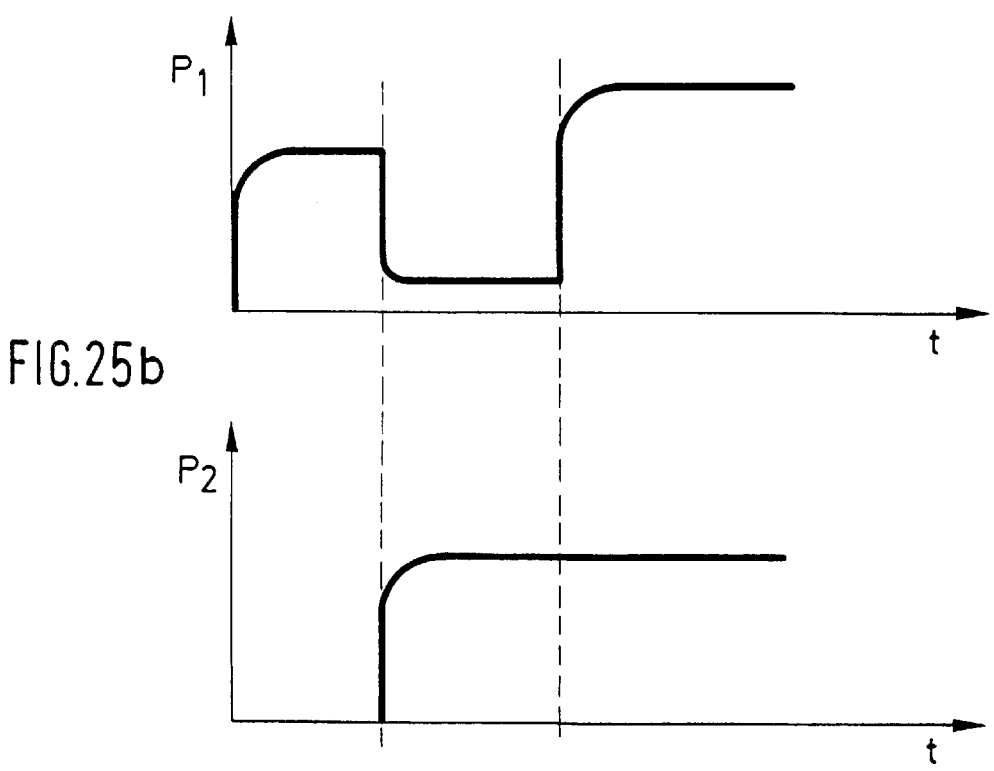

The diagrams of FIGS. 23–25, which show dependence of pressure from time, again make it clear how the pressure media can be used in different ways and manner for acting on the thermoplastic material melt filling the cavity to form, in the infection-molded plastic article, the hollow space 3, with generally uniform minimum wall thickness.

It has been determined that in many cases it may be advantageous to repeatedly change the difference between the pressures P1 and P2 during the injection and also after the injection of the thermoplastic material melt. This substantially improves the migration of different gaseous voids through the plastic material melt. Such an operational possibility is shown in the diagram of FIG. 23. First of all it can be recognized, that the pressures at separate operational intervals need not have the same values. It can be expedient to provide pressure intervals having an increased or decreased pressure difference to insure an optimal migration of the voids.

With the use of a plurality of channels 10a, 10b, 10c for feeding of the pressure medium, as shown, e.g., in FIG. 15, it is conceivable to effect the feeding of the pressure medium at different points, at different times and at a different pressure so that at different feeding locations, an arbitrary timing of applying the pressure can be realized.

As it can be seen from FIG. 24, it can be expedient, in the interest of an optimal migration of the pressure medium voids, to first have the pressure at one feeding location drop and, at another feeding location, increase but only after a certain time interval, or vice versa, as it is shown in the left half (a) of FIG. 24. The right half (b) of FIG. 24 shows that time overlapping between separate pressures P1 and P2 can take place, with the time overlapping being freely selected, primarily dependent on a respective article.

This operational possibility can be used when there are several feeding locations 10, 10b, 10c, as can be seen in FIG. 15.

Finally, FIG. 25 shows that end pressures P1 and P2, produced after maintaining a dwell pressure, need not have necessarily the same magnitude.

When these pressure have the same magnitude (P1=P2 or PX), then the pressure medium at all feeding locations would be quasi restrained, and no medium flow would take place.

However, if pressures P1, P2 or PX are different, then as a result of the pressure drop, medium flow from a high pressure point to a lower pressure point takes place, so that a media, exchange takes place.

In the left half (a) of FIG. 25 it is shown that the dwell pressure for P1 is smaller than the dwell pressure for pressure P2. In this case, medium flow from the feeding location of the pressure P2 to the feeding location of the pressure P1 takes place.

In the right half of FIG. 25, an opposite case can be seen. Here, the dwell pressure P1 is bigger than the dwell pressure P2, so that medium flow from P1 to P2 takes place.

Thus, a pressure difference between two separate feeding location results in a media exchange and, consequently, an improvement in heat transfer is achieved.

With more than two feeding locations 10a, 10b, 10c, as shown in FIG. 15, it should be insured that a controllable medium flow is produced. This is achieved, at a respective geometry of an article, by matching the pressures at separate feeding locations so that medium flow takes place from the feeding locations 10a, 10b, 10c toward the feeding location 13 or vice versa, from the feeding location 13 to the feeding locations 10a, 10b or 10c. For the intensification of cooling in separate regions, it can be expedient to provide a directed medium flow only to one or another medium feeding location, and then to decrease the medium pressure and effect a directed medium flow to the conventional feeding location at a reduced pressure.

List of Reference Numerals

Injection-molded plastic article
1a, 1b, 1c, 1d Leg
2 Wall
3 Hollow-space
4 Thickness, a minimum wall thickness
5 Mold
6 Cavity
7 Gate
8 Medium pressure void
8a, 8b Medium pressure void
9 Portion
9a, 9b, 9c Portion
10 Channel
10a, 10b, 10c Channel
11 Medium pressure void
11a, 11b, 11c Medium pressure void
12 Injection molded plastic article
13 Channel 13a, 13b Channel
14 Injection-molded plastic article
15 Injection-molded plastic article
16—16 Separation plane
17a, 17b Gate
18a, 18b Branch channel
19 Distribution channel
20 Connecting channel
21 Injection-molded plastic article
22 Wall
23 Hollow space
24 Thickness, minimum wall thickness
25 Mold
26 Cavity
27 Gate
30 Channel
31 Additional volume
33 Channel
34 "Waste Coss"
35 Weak point

We claim:

1. A method of injection molding of articles which are made of thermoplastic material and the walls of which enclose a hollow space, the method comprising the steps of:

providing a mold having a cavity a shape of which corresponds to a shape of the injection molded articles;

injecting into the cavity a predetermined amount of a plastic material melt at a plurality of locations;

feeding of a first fluid pressure medium into the cavity at a plurality of first locations corresponding in number to a number of locations through which the plastic material melt is fed into the cavity and then into the plastic material melt in a flow direction of the plastic material melt in an amount and under a pressure necessary to form a first pressure medium void inside the plastic material melt spaced from flow path ends; and feeding of a second fluid pressure medium, having an increased pressure in comparison with the first pressure medium, into the cavity at a plurality of second locations corresponding in number to the number of the first locations and into the plastic material melt in a direction substantially opposite to the flow direction of the plastic material melt, whereby a second pressure medium void is formed and is increased in the direction opposite to the flow direction of the plastic material melt, and is finally united with the first pressure medium void, with a positive pressure difference between the pressures in the second and first pressure medium voids being maintained until said voids are united, wherein after formation of a hollow space, as a result of union of the first and second pressure medium voids, a dwell pressure, which corresponds to the pressure of the second fluid pressure medium and acts in the direction opposite to the flow direction of the plastic material melt, is established in the hollow space and is varied.

2. A method according to claim 1, wherein the time delay between the feedings of the first and second pressure media is varied.

3. A method according to claim 1, wherein the first fluid pressure medium, together with the plastic material melt, is fed through a nozzle of an injection unit.

4. A method according to claim 1, wherein the first fluid pressure medium is fed adjacent to gates (13; 13*a*, 13*b*).

* * * * *